United States Patent
Ikeuchi

(10) Patent No.: US 11,981,792 B2
(45) Date of Patent: May 14, 2024

(54) CURABLE COMPOSITION AND COATING FILM WATERPROOFING AGENT

(71) Applicant: Sekisui Fuller Company, Ltd., Tokyo (JP)

(72) Inventor: Takuto Ikeuchi, Shiga (JP)

(73) Assignee: SEKISUI FULLER COMPANY, LTD., Tokyo (JP)

(*) Notice: Subject to any disclaimer, the term of this patent is extended or adjusted under 35 U.S.C. 154(b) by 0 days.

(21) Appl. No.: 16/961,381

(22) PCT Filed: Jan. 11, 2019

(86) PCT No.: PCT/JP2019/000803
§ 371 (c)(1),
(2) Date: Jul. 10, 2020

(87) PCT Pub. No.: WO2019/139157
PCT Pub. Date: Jul. 18, 2019

(65) Prior Publication Data
US 2020/0354543 A1 Nov. 12, 2020

(30) Foreign Application Priority Data
Jan. 12, 2018 (JP) .................. 2018-003115

(51) Int. Cl.
C08K 3/34 (2006.01)
C09D 7/61 (2018.01)
C09D 171/02 (2006.01)

(52) U.S. Cl.
CPC .................. *C08K 3/34* (2013.01); *C09D 7/61* (2018.01); *C09D 171/02* (2013.01); C08K 2201/003 (2013.01)

(58) Field of Classification Search
CPC .......... C09D 171/02; C09D 7/61; C09D 5/00; C08L 71/02; C08K 3/34; C08K 2201/003; C08G 65/336
See application file for complete search history.

(56) References Cited

U.S. PATENT DOCUMENTS

| | | | |
|---|---|---|---|
| 9,528,005 B1* | 12/2016 | Miriani | C08K 3/36 |
| 2004/0221953 A1* | 11/2004 | Czaplicki | B62D 29/002 |
| | | | 156/330 |
| 2011/0042004 A1* | 2/2011 | Schubert | B32B 37/1284 |
| | | | 156/329 |
| 2014/0018485 A1* | 1/2014 | Cook | C08K 3/346 |
| | | | 524/588 |
| 2015/0017435 A1* | 1/2015 | Xu-Rabl | C08J 3/243 |
| | | | 264/231 |
| 2017/0210913 A1* | 7/2017 | Dubey | C09D 183/06 |
| 2017/0342191 A1* | 11/2017 | Osakabe | C01F 11/18 |

FOREIGN PATENT DOCUMENTS

| | | |
|---|---|---|
| JP | 2001-115609 | 4/2001 |
| JP | 2004123943 A * | 4/2004 |
| JP | 2015110720 A * | 6/2015 |
| JP | 2017137473 A * | 8/2017 |

OTHER PUBLICATIONS

International Search Report dated Apr. 9, 2019 in International (PCT) Application No. PCT/JP2019/000803.

* cited by examiner

*Primary Examiner* — John D Freeman
(74) *Attorney, Agent, or Firm* — WENDEROTH, LIND & PONACK, L.L.P.

(57) ABSTRACT

The present invention provides a curable composition excellent in rubber elasticity, coating film strength, coatability, and adhesion to a waterproof base and the like. The curable composition of the present invention contains a polyalkylene oxide having a hydrolyzable silyl group, and feldspars having an average particle diameter of 0.01 to 100 μm, and preferably further contains calcium carbonate. The feldspars may preferably contain nepheline syenite. The curable composition can form a cured product having excellent rubber elasticity and coating film strength, and excellent adhesion, while being low in viscosity and excellent in coatability.

2 Claims, No Drawings

CURABLE COMPOSITION AND COATING FILM WATERPROOFING AGENT

CROSS-REFERENCE TO RELATED APPLICATIONS

The present application is a national stage application filed under § 371 of international application no. PCT/JP2019/000803, filed Jan. 11, 2019, and it claims foreign priority to Japan patent application no. 2018-003115, filed Jan. 12, 2018, the disclosure of which is hereby incorporated by reference in its entirety.

TECHNICAL FIELD

The present invention relates to a curable composition and a coating film waterproofing agent.

BACKGROUND ART

Conventionally, coating films have been formed on rooftops of concrete structures for waterproofing. Patent Literature 1 discloses a urethane waterproof material composed of a urethane elastic foam. The urethane elastic foam has a foaming ratio of 2 to 10 times, a percent elongation of 200 to 1000%, and a tensile strength of 20 to 100 kg/cm$^2$.

CITATION LIST

Patent Literature

Patent Literature 1: Japanese Patent Application Laid-Open No. 2001-115609

SUMMARY OF INVENTION

Technical Problem

However, the urethane material used for constructing the urethane waterproof material disclosed in Patent Literature 1 contains a solvent. Therefore, in order to reduce the burden on the work environment and the global environment, the use of a solvent-free material has been investigated.

The above-described waterproof coating film is required to have a rubber elasticity capable of accommodating not only expansion and contraction accompanied with temperature change of concrete structure to be a waterproof base but also extension of waterproof base due to crack accompanied with time degradation. Such a waterproof coating film is required to have adhesion to a waterproof base.

Therefore, it is conceivable that a modified silicone resin is adopted among solvent-free materials.

However, although the modified silicone resin is excellent in rubber elasticity, the coating film strength thereof is low. To cope with this problem, if a filler is added to the resin in order to improve the coating film strength, another problem may arise in that the coatability is lowered.

The present invention provides a curable composition excellent in rubber elasticity, coating film strength, coatability, and adhesion to a waterproof base and the like.

Solution to Problem

The curable composition of the present invention is characterized by containing:
a polyalkylene oxide having a hydrolyzable silyl group; and
feldspars having an average particle diameter of 0.01 to 100 μm.

[Polyalkylene Oxide]

The polyalkylene oxide contained in the curable composition has a hydrolyzable silyl group. The hydrolyzable silyl group is a group in which 1 to 3 hydrolyzable groups are bonded to a silicon atom.

The hydrolyzable groups of the hydrolyzable silyl group are not particularly limited, and examples thereof include a hydrogen atom, a halogen atom, an alkoxy group, an acyloxy group, a ketoxymate group, an amino group, an amide group, an acid amide group, an aminooxy group, a mercapto group, and an alkenyloxy group.

Among these, the hydrolyzable silyl group is preferably an alkoxysilyl group, because the hydrolysis reaction is moderate. Examples of the alkoxysilyl group include trialkoxysilyl groups, such as a trimethoxysilyl group, a triethoxysilyl group, a triisopropoxysilyl group, and a triphenoxysilyl group; dialkoxysilyl groups, such as a dimethoxysilyl group, a diethoxysilyl group, a methyldimethoxysilyl group, and a methyldiethoxysilyl group; and monoalkoxysilyl groups, such as a dimethylmethoxysilyl group and a dimethylethoxysilyl group. Among these, a dialkoxysilyl group is more preferable, and a methyldimethoxysilyl group is particularly preferable.

The polyalkylene oxide preferably has 1 to 4 hydrolyzable silyl groups per molecule on an average. The polyalkylene oxide having one or more hydrolyzable silyl groups improves the curability of the curable composition. The polyalkylene oxide having 4 or less hydrolyzable silyl groups allows the curable composition to produce a cured product having excellent rubber elasticity.

The average number of the hydrolyzable silyl groups per molecule in the polyalkylene oxide can be calculated on the basis of the concentration of the hydrolyzable silyl groups in the polyalkylene oxide determined by $^1$H-NMR, and a number-average molecular weight of the polyalkylene oxide determined by a GPC method.

Examples of the polyalkylene oxide preferably include a polymer whose main chain contains a repeating unit represented by the general formula: —(R—O)$_n$— (in which R represents an alkylene group having 1 to 14 carbon atoms, and n is the number of repeating units, which is a positive integer). The main chain skeleton of the polyalkylene oxide may be constituted by only one type of repeating unit, or may be constituted by two or more types of repeating units.

Examples of the main chain skeleton of the polyalkylene oxide include polyethylene oxide, polypropylene oxide, polybutylene oxide, polytetramethylene oxide, a polyethylene oxide-polypropylene oxide copolymer, and a polypropylene oxide-polybutylene oxide copolymer. Among these, polypropylene oxide is preferable. Due to the polypropylene oxide, the curable composition can produce a cured product having excellent rubber elasticity.

The number-average molecular weight of the polyalkylene oxide is preferably 3,000 to 50,000, and more preferably 10,000 to 30,000. The polyalkylene oxide having a number-average molecular weight of 10,000 or more improves the rubber elasticity of the cured product of the curable composition. The polyalkylene oxide having a number-average molecular weight of 50,000 or less improves the coatability of the curable composition.

In the present invention, the number-average molecular weight of the polyalkylene oxide means a value in terms of polystyrene measured by the GPC (gel permeation chromatography) method. In measurements by the GPC method, for example, Shodex KF800D manufactured by Tosoh Corporation may be used as a GPC column, and chloroform may be used as a solvent.

As the polyalkylene oxide having a hydrolyzable silyl group, a commercially available product may be used. Examples thereof include MS polymers S-203 and S-303 (product names) manufactured by Kaneka Corporation; Silyl polymers SAT-200, SAT-350, and SAT-400 (product names) manufactured by Kaneka Corporation; and Excestar ESS-3620, ESS-2420, ESS2410, and ESS3430 (product names) manufactured by AGC Inc.

[Feldspars]

The curable composition contains feldspars. The feldspars contain feldspar and feldspathoid, with the feldspathoid being preferred.

Examples of the feldspar include alkaline feldspars such as orthoclase, sanidine, microcline feldspar, and anorthoclase; and plagioclase feldspar such as albite, oligoclase, andesine, labradorite, bytownite, and anorthite.

Examples of the feldspathoid include nepheline such as kaliophilite (kalsilite) and cancrinite, nepheline syenite, amphigene (leucite), sodalite, hauynite, lazurite, noselite (nosean), and melilite, with nepheline syenite being preferable. Note that the nepheline syenite may be described as a syenite.

The average particle diameter of the feldspars is 0.01 to 100 μm, preferably 0.1 to 50 μm, more preferably 1 to 25 μm, particularly preferably 2 to 15 μm, and particularly preferably 3 to 10 μm. The feldspars having an average particle diameter of 0.01 μm or more allows the curable composition to produce a cured product having excellent coating film strength. The feldspars having an average particle diameter of 100 μm or less can be uniformly dispersed in the curable composition, and thus the curable composition can produce a cured product having excellent coating film strength. The average particle diameter of the feldspars is a value measured by image analysis using a transmission electron microscope. Specifically, a magnified photograph of the feldspars at 100 times magnification is taken using a transmission electron microscope, freely-selected 50 feldspars are extracted, the diameters of the respective feldspars are measured, and the arithmetic average value of the diameters of the respective feldspars is calculated to be used as the average particle diameter of the feldspars. The diameter of the feldspars means a diameter of a true circle having a minimum diameter that can surround the feldspars.

The contained amount of the feldspars in the curable composition is preferably 1 to 800 parts by mass, preferably 30 to 600 parts by mass, more preferably 50 to 450 parts by mass, and particularly preferably 80 to 300 parts by mass, relative to 100 parts by mass of the polyalkylene oxide having a hydrolyzable silyl group. Adjusting the contained amount of the feldspars within the above-described range can provide the curable composition which has excellent coatability and is capable of producing a cured product having excellent rubber elasticity and coating film strength.

[Plasticizer]

The curable composition preferably further contains a plasticizer. The curable composition containing a plasticizer can produce a cured product having excellent rubber elasticity and excellent followability.

Examples of the plasticizer include phthalate esters, such as dimethyl phthalate, diethyl phthalate, dibutyl phthalate, diisobutyl phthalate, dinormalhexyl phthalate, bis(2-ethylhexyl) phthalate, dinormaloctyl phthalate, diisononyl phthalate, dinonyl phthalate, diisodecyl phthalate, diisoundecyl phthalate, and bisbutylbenzyl phthalate; and polyalkylene glycols, such as diethylene glycol, triethylene glycol, tetraethylene glycol, dipropylene glycol, tripropylene glycol, and tetrapropylene glycol. Among these, polyalkylene glycol is preferable, and polypropylene glycol is more preferable.

The number-average molecular weight of the polyalkylene glycol is preferably 1,000 to 10,000, and more preferably 2,000 to 5,000. The curable composition containing such polyalkylene glycol having the number-average molecular weight falling within the above-described range can produce a cured product having excellent rubber elasticity and excellent followability.

The number-average molecular weight of the polyalkylene glycol is a value in terms of polystyrene measured by the GPC (Gel Permeation Chromatography) method. Specific measurement methods and measurement conditions are the same as those of the above-mentioned polyalkylene oxide having a hydrolyzable silyl group.

The contained amount of the plasticizer in the curable composition is preferably 1 to 100 parts by mass, more preferably 10 to 80 parts by mass, particularly preferably 15 to 60 parts by mass, and most preferably 20 to 50 parts by mass, relative to 100 parts by mass of the polyalkylene oxide having a hydrolyzable silyl group.

[Filler]

The curable composition may further contain a filler. The curable composition containing a filler can provide a curable composition capable of obtaining a cured product having excellent rubber elasticity.

The filler is not particularly limited, and examples thereof include calcium carbonate, magnesium carbonate, calcium oxide, hydrous silicic acid, anhydrous silicic acid, fine powder silica, calcium silicate, titanium dioxide, clay, talc, carbon black, and glass balloon. Calcium carbonate is preferable, and heavy calcium carbonate is more preferable. The filler may be used alone, or in combination of two or more kinds thereof.

The average particle diameter of the filler is preferably 0.01 to 5 μm, and more preferably 0.05 to 2.5 μm. The use of the filler having such an average particle diameter can provide a curable composition capable of producing a cured product having excellent adhesion to a waterproof base and the like. The average particle diameter of the filler is a value measured by image analysis using a transmission electron microscope. Specifically, a magnified photograph of the filler at 100 times magnification is taken using a transmission electron microscope, arbitrary 50 fillers are extracted, the diameters of the respective fillers are measured, and the arithmetic average value of the diameters of the respective fillers is calculated to be used as the average particle diameter of the filler. The diameter of the filler means a diameter of a true circle having a minimum diameter that can surround the filler.

The calcium carbonate is preferably surface-treated with a fatty acid, a fatty acid ester, or the like. The calcium carbonate surface-treated with a fatty acid, a fatty acid ester, or the like can impart thixotropic properties to the curable composition and suppress aggregation of the calcium carbonate itself.

The contained amount of the filler in the curable composition is preferably 1 to 700 parts by mass, more preferably 10 to 200 parts by mass, and particularly preferably 20 to 150 parts by mass, relative to 100 parts by mass of the polyalkylene oxide having a hydrolyzable silyl group. The curable composition containing 1 part by mass or more of the filler sufficiently exhibits the effect by addition of the filler. The curable composition containing 700 parts by mass or less of the filler can produce a cured product having excellent adhesion to a waterproof base and the like.

[Dehydrating Agent]

The curable composition preferably further contains a dehydrating agent. The dehydrating agent is capable of suppressing curing of the curable composition by moisture contained in air or the like when the curable composition is stored.

Examples of the dehydrating agent include silane compounds, such as vinyltrimethoxysilane, dimethyldimethoxysilane, tetraethoxysilane, methyltrimethoxysilane, methyltriethoxysilane, tetramethoxysilane, phenyltrimethoxysilane, and diphenyldimethoxysilane; and ester compounds, such as methyl orthoformate, ethyl orthoformate, methyl orthoacetate, and ethyl orthoacetate. These dehydrating agents may be used alone, or in combination of two or more kinds thereof. Among these, vinyltrimethoxysilane is preferable.

The contained amount of the dehydrating agent in the curable composition is preferably 0.5 to 20 parts by mass, and more preferably 1 to 15 parts by mass, relative to 100 parts by mass of the polyalkylene oxide having a hydrolyzable silyl group. The curable composition containing 0.5 parts by mass or more of the dehydrating agent sufficiently exhibits the effect obtained by the dehydrating agent. The curable composition containing 20 parts by mass or less of the dehydrating agent has excellent curability.

[Silanol Condensation Catalyst]

The curable composition preferably contains a silanol condensation catalyst. The silanol condensation catalyst is a catalyst for promoting a dehydration condensation reaction between silanol groups formed by hydrolysis of the hydrolyzable silyl group or the like contained in the polyalkylene oxide.

Examples of the silanol condensation catalyst include organic tin-based compounds, such as 1,1,3,3-tetrabutyl-1,3-dilauryloxycarbonyl-distannoxane, dibutyltin dilaurate, dibutyltin oxide, dibutyltin diacetate, dibutyltin phthalate, bis(dibutyltin laurate) oxide, dibutyltin bis(acetylacetonate), dibutyltin bis(monoestermalate), tin octylate, dibutyltin octoate, dioctyltin oxide, dibutyltin bis(triethoxysilicate), bis(dibutyltin bistriethoxysilicate) oxide, and dibutyltin oxybisethoxysilicate; and organic titanium-based compounds, such as tetra-n-butoxytitanate, and tetraisopropoxytitanate. These silanol condensation catalysts may be used alone, or in combination of two or more kinds thereof.

The silanol condensation catalyst is preferably 1,1,3,3-tetrabutyl-1,3-dilauryloxycarbonyl-distannoxane. Such a silanol condensation catalyst can easily adjust the curing rate of the curable composition.

The contained amount of the silanol condensation catalyst in the curable composition is preferably 1 to 10 parts by mass, and more preferably 1 to 5 parts by mass, relative to 100 parts by mass of the polyalkylene oxide having a hydrolyzable silyl group. The curable composition containing 1 part by mass or more of the silanol condensation catalyst can increase its curing rate to shorten the time required for curing the curable composition. In addition, the curable composition containing 10 parts by mass or less of the silanol condensation catalyst has a moderate curing rate and can improve storage stability and handleability thereof.

[Other Additives]

The curable composition may include other additives, such as a thixotropic agent, an antioxidant, a ultraviolet absorber, a pigment, a dye, an anti-sedimentation agent, and a solvent. Among these, a thixotropic agent, an ultraviolet absorber, and an antioxidant are preferable.

The thixotropic agent may be any agent as long as the agent is capable of imparting thixotropic properties to the curable composition. Examples of the thixotropic agent preferably include a hydrogenated castor oil, fatty acid bisamide, and fumed silica.

The contained amount of the thixotropic agent in the curable composition is preferably 0.1 to 200 parts by mass, and more preferably 1 to 150 parts by mass, relative to 100 parts by mass of the polyalkylene oxide having a hydrolyzable silyl group. The thixotropic agent contained in a contained amount of 0.1 parts by mass or more in the curable composition can effectively impart thixotropic properties to the curable composition. In addition, the curable composition containing 200 parts by mass or less of the thixotropic agent has an appropriate viscosity, and the handleability of the curable composition is improved.

Examples of the ultraviolet absorber include a triazine-based ultraviolet absorber, a benzotriazole-based ultraviolet absorber, and a benzophenone-based ultraviolet absorber. A benzotriazole-based ultraviolet absorber and a benzophenone-based ultraviolet absorber are preferable, and a benzotriazole-based ultraviolet absorber is more preferable. The contained amount of the ultraviolet absorber in the curable composition is preferably 0.1 to 20 parts by mass, and more preferably 0.1 to 10 parts by mass, relative to 100 parts by mass of the polyalkylene oxide having a hydrolyzable silyl group.

Examples of the antioxidant include a hindered phenol-based antioxidant, a monophenol-based antioxidant, a bisphenol-based antioxidant, and a polyphenol-based antioxidant. A hindered phenol-based antioxidant is preferable. The contained amount of the antioxidant in the curable composition is preferably 0.1 to 20 parts by mass, and more preferably 0.3 to 10 parts by mass, relative to 100 parts by mass of the polyalkylene oxide having a hydrolyzable silyl group.

[Light Stabilizer]

The curable composition preferably contains a light stabilizer, more preferably a hindered amine-based light stabilizer. The hindered amine-based light stabilizer can provide a curable composition capable of maintaining excellent rubber elasticity and coating film strength for a long period of time after curing.

Examples of the hindered amine-based light stabilizer include a mixture of bis(1,2,2,6,6-pentamethyl-4-piperidyl) cebacate and methyl 1,2,2,6,6-pentamethyl-4-piperidyl cebacate, bis(2,2,6,6-tetramethyl-4-piperidyl)cebacate, a polycondensate of dibutylamine•1,3,5-triazine•N,N'-bis(2,2,6,6-tetramethyl-4-piperidyl-1,6-hexamethylenediamine) with N-(2,2,6,6-tetramethyl-4-piperidyl) butylamine, poly [{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}], and a polycondensate of dimethyl succinate with 4-hydroxy-2,2,6,6-tetramethyl-1-piperidine ethanol.

The hindered amine-based light stabilizer is preferably an NOR-type hindered amine-based light stabilizer. The NOR-type hindered amine-based light stabilizer can provide a curable composition capable of suppressing a decrease in rubber elasticity and coating film strength over time after curing.

The NOR-type hindered amine-based light stabilizer has an NOR structure in which an alkyl group (R) is bonded via an oxygen atom (O) to a nitrogen atom (N) contained in a piperidine ring skeleton. The number of carbon atoms of the alkyl group in the NOR structure is preferably 1 to 20, more preferably 1 to 18, and particularly preferably 18. Examples of the alkyl group include a linear alkyl group, a branched alkyl group, and a cyclic alkyl group (saturated alicyclic hydrocarbon group).

Examples of the linear alkyl group include a methyl group, an ethyl group, an n-propyl group, an n-butyl group, an n-pentyl group, an n-hexyl group, an n-octyl group, an n-nonyl group, and an n-decyl group. Examples of the branched alkyl group include an isopropyl group, an isobutyl group, a sec-butyl group, and a tert-butyl group. Examples of the cyclic alkyl group (saturated alicyclic hydrocarbon group) include a cyclopentyl group, a cyclohexyl group, and a cyclooctyl group. The hydrogen atom constituting the alkyl group may be substituted with a halogen atom (for example, a fluorine atom, a chlorine atom, a bromine atom) or a hydroxyl group, or the like.

Examples of the NOR-type hindered amine-based light stabilizer include a hindered amine-based light stabilizer represented by the following formula (I).

[Chemical formula 1]

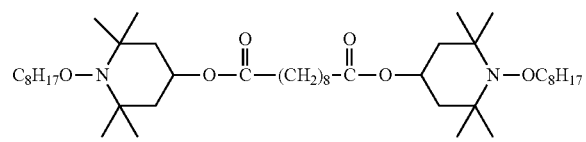

(I)

When the NOR-type hindered amine-based light stabilizer is used, it is preferable to use a combination of an NOR-type hindered amine-based light stabilizer, and a benzotriazole-based ultraviolet absorber or a triazine-based ultraviolet absorber. This can provide a curable composition capable of more suppressing a decrease in rubber elasticity and coating film strength over time after curing.

The contained amount of the light stabilizer in the curable composition is preferably 0.01 to 20 parts by mass, and more preferably 0.1 to 10 parts by mass, relative to 100 parts by mass of the polyalkylene oxide having a hydrolyzable silyl group.

The curable composition can be produced by uniformly mixing the polyalkylene oxide having a hydrolyzable silyl group and feldspars, and additives added as necessary. Preferably, the curable composition does not contain a solvent, such as alcohol, xylene, toluene, and the like.

The curable composition can be used for various use applications such as a coating film waterproofing agent, a coating material, and a paint because it has an excellent adherence property and can form a cured product capable of maintaining excellent rubber elasticity and coating film strength for a long period of time. Among these, the curable composition is preferably used as a coating film waterproofing agent.

The curable composition is preferably used as a coating film waterproofing agent as described above. Specifically, the curable composition is applied to a concrete surface that serves as a waterproof base, such as a rooftop of a concrete structure. At this time, since the curable composition is excellent in coatability, it can be smoothly and uniformly coated on the waterproof base. The waterproof coating film can be formed by aging and curing the curable composition.

The use of the curable composition can constitute a waterproof structure including a waterproof base and a waterproof coating film provided on the surface of the waterproof base and containing a cured product of the curable composition.

The resulting waterproof coating film has excellent rubber elasticity and coating film strength, and excellent adhesion to the waterproof base and the like. Thus, the waterproof coating film smoothly follows not only expansion and contraction due to temperature change of the waterproof base but also extension of the waterproof base due to cracks accompanied with time degradation of the waterproof base, and can maintain excellent waterproof performance without causing cracks or the like for a long period of time.

Advantageous Effects of Invention

The curable composition of the present invention can form a cured product having excellent rubber elasticity and coating film strength, and excellent adhesion, while being low in viscosity and excellent in coatability.

DESCRIPTION OF EMBODIMENTS

In the following, the present invention will be described in further detail below with reference to examples, but the present invention is not limited thereto.

EXAMPLES

The following compounds were used in Examples and Comparative Examples.

Polyalkylene oxide 1 (Polyalkylene oxide having a main chain skeleton of polypropylene oxide and a propyl dimethoxysilyl group at the end of the main chain, the average number of methyldimethoxysilyl groups per molecule: 1.4, the number-average molecular weight: 14,000, trade name "MS Polymer SAT350" manufactured by Kaneka Corporation)

Polyalkylene oxide 2 (Polyalkylene oxide having a main chain skeleton of polypropylene oxide and a methyl dimethoxysilyl group at the end of the main chain, the number-average molecular weight: 9,000, trade name "MS Polymer EST280" manufactured by Kaneka Corporation)

Polyalkylene oxide 3 (Polyalkylene oxide having a main chain skeleton of polypropylene oxide and a methyl dimethoxysilyl group at the end of the main chain, the number-average molecular weight: 16,000, trade name "Excestar 53430" manufactured by AGC Inc.)

Feldspars (nepheline syenite, average particle diameter: 5 μm, trade name "Nesper" manufactured by Shiraishi Calcium Kaisha, Ltd.)

Silanol condensation catalyst (1,1,3,3-tetrabutyl-1,3-dilauryloxycarbonyl-distanoxane, trade name "Neostan U-130" manufactured by Nitto Kasei Co., Ltd.)

Aminosilane coupling agent [N-(2-aminoethyl)-3-aminopropyltrimethoxysilane, trade name KBM-603 manufactured by Shin-Etsu Chemical Co.]

Epoxysilane coupling agent (3-glycidoxypropyltrimethoxysilane, trade name "KBM-403" manufactured by Shin-Etsu Chemical Co., Ltd.)

Colloidal calcium carbonate (trade name "CCR" manufactured by Shiraishi Kogyo Kaisha, Ltd.)

Heavy calcium carbonate 1 (trade name "NCC2310" manufactured by Ishihara Sangyo Kaisha, Ltd.)

Heavy Calcium Carbonate 2 (trade name "μ-powder 3S" manufactured by Shiraishi Calcium Kaisha, Ltd.)

Kaolin (trade name "ASP170" manufactured by Hayashi Kasei Co., Ltd.)
Carbon Black (product name "8500F" by Asahi Carbon Co., Ltd.)
Plasticizer (polypropylene glycol, number-average molecular weight: 3,000, trade name "P-3000" manufactured by ADEKA Corporation)
Dehydrating agent (vinyltrimethoxysilane, trade name "NUC-Silicone A171" manufactured by NUC Co., Ltd.)
Benzotriazol-based ultraviolet absorbent (product name "Tinuvin 326" manufactured by BASF Japan Ltd.)
Hindered phenol-based antioxidant (product name "Irganox 1010" manufactured by BASF Japan Ltd.)
Hindered amine-based light stabilizer (product name "Tinuvin 770" manufactured by BASF Japan Ltd.)

Examples 1 to 12 and Comparative Examples 1 to 7

The polyalkylene oxides 1 to 3, feldspars, silanol condensation catalyst, aminosilane coupling agent, epoxysilane coupling agent, colloidal calcium carbonate, heavy calcium carbonate 1, heavy calcium carbonate 2, kaolin, carbon black, plasticizer, dehydrating agent, benzotriazole-based ultraviolet absorber, hindered phenol-based antioxidant, and hindered amine-based light stabilizer in respective predetermined amounts shown in Table 1 were supplied to a planetary mixer, and mixed and kneaded for 60 minutes under a vacuum atmosphere to obtain a curable composition.

The viscosity, Ti value, maximum stress, elongation at break, and compression shear strength of the resulting curable composition were measured according to the following manners, and the results are shown in Table 1.

(Evaluation of Coatability: Viscosity)

The viscosity of the curable composition was measured with an H-type viscometer under the conditions of 23° C. and 10 rpm.

(Evaluation of Coatability: Ti Value)

The viscosity of the curable composition (at 10 rpm) was measured with a BH type viscometer using a rotor No. 5 under the conditions of 23° C. and 10 rpm. The viscosity of the curable composition (at 1 rpm) was measured with a BH type viscometer using a rotor No. 5 under the conditions of 23° C. and 1 rpm. The Ti value of the curable composition was calculated on the basis of the following formula.

$$Ti\ \text{value} = \text{Viscosity (at 1 rpm)}/\text{Viscosity (at 10 rpm)}$$

(Evaluations of Coating Film Strength and Rubber Elasticity: Maximum Stress and Elongation at Break)

After applying the curable composition to the release-treated substrate to have a thickness of 3 mm, the curable composition was aged at 23° C. and 50% relative humidity for one month. The cured product of the curable composition was cut into a No. 3 dumbbell in accordance with JIS K6251 to prepare a test piece.

On the surface of the test piece, a pair of straight lines perpendicular to the tensile direction and parallel to each other was drawn as a gauge line. The distance between the gauge lines (initial gauge line distance) was 20 mm. The test piece was pulled at a speed of 500 mm/min under conditions of 23° C. humidity and 50% relative humidity.

The tensile stress at the time of generating cracks in the test piece was measured, and the measured value was assumed as the maximum stress (N/mm$^2$).

The distance between the gauge lines at the time of generating cracks in the test piece (breaking-time gauge line distance) was measured. The elongation at break (%) was calculated on the basis of the following formula.

Elongation at break (%)=100×(breaking-time gauge line distance−initial gauge line distance)/(initial gauge line distance)

(Evaluation of Adhesion: Compression Shear Strength)

Two aluminum-alloy sheets specified in JIS H4000 A5052 were prepared. The aluminum alloy sheets were 12 mm in length, 50 mm in width, and 4.0 mm in thickness and had a planar rectangular shape.

The curable composition was applied to the surface of one aluminum alloy sheet, and the other aluminum alloy sheet was superimposed on the curable composition-coated surface thereof to produce a laminate. The curable composition was applied onto the aluminum alloy sheet so that the coating width (longitudinal direction) was 12 mm, the coating length (lateral direction) was 10 mm, and the coating thickness was 0.3 mm.

The laminate was left in an environment of 23° C. and 50% relative humidity for 7 days to cure the curable composition to bond and integrate the two aluminum alloy sheets to and with each other by the curable composition, so that a test piece was produced.

A compression test using the obtained test piece was performed using a versatile tensile testing machine (manufactured by Instron Japan Co., Ltd.) at a speed of 3 mm/minute, so that the compression shear strength of the cured product of the curable composition constituting the test piece at the time of breakage was measured.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Formulation [part by mass] | Polyalkylene oxide 1 | 100 | 100 | 100 | 100 | 100 | 100 | 100 | 0 | 0 | 100 |
| | Polyalkylene oxide 2 | 0 | 0 | 0 | 0 | 0 | 0 | 0 | 100 | 0 | 0 |
| | Polyalkylene oxide 3 | 0 | 0 | 0 | 0 | 0 | 0 | 0 | 0 | 100 | 0 |
| | Silanol condensation catalyst | 2 | 2 | 2 | 2 | 2 | 2 | 2 | 2 | 2 | 2 |
| | Aminosilane coupling agent | 4 | 4 | 4 | 4 | 4 | 4 | 4 | 4 | 4 | 4 |
| | Epoxysilane coupling agent | 1 | 1 | 1 | 1 | 1 | 1 | 1 | 1 | 1 | 1 |
| | Colloidal calcium carbonate | 0 | 0 | 0 | 0 | 0 | 0 | 0 | 0 | 0 | 0 |
| | Heavy calcium carbonate 1 | 0 | 0 | 0 | 0 | 0 | 0 | 0 | 0 | 0 | 80 |
| | Heavy calcium carbonate 2 | 0 | 0 | 0 | 0 | 0 | 0 | 0 | 0 | 0 | 0 |
| | Feldspars | 80 | 120 | 200 | 250 | 300 | 350 | 400 | 300 | 200 | 120 |
| | Kaolin | 0 | 0 | 0 | 0 | 0 | 0 | 0 | 0 | 0 | 0 |
| | Carbon black | 0 | 0 | 0 | 0 | 0 | 0 | 0 | 0 | 0 | 0 |
| | Plasticizer | 40 | 40 | 40 | 40 | 40 | 40 | 40 | 40 | 40 | 40 |
| | Dehydrating agent | 3 | 3 | 3 | 3 | 3 | 3 | 3 | 3 | 3 | 3 |
| | Benzotriazol-based UV absorbent | 1 | 1 | 1 | 1 | 1 | 1 | 1 | 1 | 1 | 1 |

TABLE 1-continued

|  |  | | | | | | | | | | |
|---|---|---|---|---|---|---|---|---|---|---|---|
| Evaluation | Hindered phenol-based antioxidant | 1 | 1 | 1 | 1 | 1 | 1 | 1 | 1 | 1 | 1 |
| | Hindered amine-based light stabilizer | 1 | 1 | 1 | 1 | 1 | 1 | 1 | 1 | 1 | 1 |
| | Viscosity [×10⁴ mPa·s] | 1.0 | 2.0 | 3.5 | 8.8 | 18.2 | 39.0 | 29.0 | 21.0 | 6.8 | 8.0 |
| | Ti value | 1.0 | 1.0 | 1.0 | 1.0 | 1.0 | 1.0 | 1.0 | 1.1 | 1.1 | 1.4 |
| | Maximum stress [N/mm²] | 2.3 | 2.8 | 3.9 | 4.2 | 4.2 | 5.0 | 4.3 | 5.6 | 3.8 | 3.4 |
| | Elongation at break | 400% | 280% | 250% | 200% | 130% | 150% | 150% | 130% | 200% | 350% |
| | Compression shear strength [MPa] | 1.2 | 2.3 | 3.3 | 3.6 | 3.8 | 3.0 | 2.3 | 2.8 | 2.7 | 2.8 |

|  |  | Example | | Comparative Example | | | | | | |
|---|---|---|---|---|---|---|---|---|---|---|
|  |  | 11 | 12 | 1 | 2 | 3 | 4 | 5 | 6 | 7 |
| Formulation [part by mass] | Polyalkylene oxide 1 | 100 | 100 | 100 | 100 | 100 | 100 | 100 | 100 | 100 |
| | Polyalkylene oxide 2 | 0 | 0 | 0 | 0 | 0 | 0 | 0 | 0 | 0 |
| | Polyalkylene oxide 3 | 0 | 0 | 0 | 0 | 0 | 0 | 0 | 0 | 0 |
| | Silanol condensation catalyst | 2 | 2 | 2 | 2 | 2 | 2 | 2 | 2 | 2 |
| | Aminosilane coupling agent | 4 | 4 | 4 | 4 | 4 | 4 | 4 | 4 | 4 |
| | Epoxysilane coupling agent | 1 | 1 | 1 | 1 | 1 | 1 | 1 | 1 | 1 |
| | Colloidal calcium carbonate | 0 | 0 | 0 | 0 | 0 | 0 | 120 | 0 | 0 |
| | Heavy calcium carbonate 1 | 0 | 0 | 120 | 300 | 0 | 0 | 0 | 0 | 0 |
| | Heavy calcium carbonate 2 | 0 | 0 | 0 | 0 | 60 | 120 | 0 | 0 | 0 |
| | Feldspars | 80 | 500 | 0 | 0 | 0 | 0 | 0 | 0 | 0 |
| | Kaolin | 0 | 0 | 0 | 0 | 0 | 0 | 0 | 200 | 0 |
| | Carbon black | 0 | 0 | 0 | 0 | 0 | 0 | 0 | 0 | 200 |
| | Plasticizer | 0 | 60 | 40 | 40 | 40 | 40 | 40 | 40 | 40 |
| | Dehydrating agent | 3 | 3 | 3 | 3 | 3 | 3 | 3 | 3 | 3 |
| | Benzotriazol-based UV absorbent | 1 | 1 | 1 | 1 | 1 | 1 | 1 | 1 | 1 |
| | Hindered phenol-based antioxidant | 1 | 1 | 1 | 1 | 1 | 1 | 1 | 1 | 1 |
| | Hindered amine-based light stabilizer | 1 | 1 | 1 | 1 | 1 | 1 | 1 | 1 | 1 |
| Evaluation | Viscosity [×10⁴ mPa·s] | 5.0 | 31.0 | 3.5 | 25.6 | 1.8 | 3.9 | 15.5 | 110.0 | 190.0 |
| | Ti value | 1.0 | 1.0 | 3.3 | 4.5 | 1.3 | 3.3 | 3.6 | 5.2 | 2.8 |
| | Maximum stress [N/mm²] | 2.4 | 3.2 | 1.6 | 1.9 | 1.5 | 1.7 | 1.7 | 3.2 | 5.0 |
| | Elongation at break | 200% | 200% | 400% | 200% | 350% | 450% | 450% | 400% | 100% |
| | Compression shear strength [MPa] | 2.1 | 3.0 | 1.5 | 2.0 | 1.7 | 2.9 | 3.0 | 2.3 | 4.0 |

INDUSTRIAL APPLICABILITY

The curable composition can form a cured product having excellent rubber elasticity and coating film strength, and the cured product has excellent adhesion to an adherend such as a waterproof base. The curable composition can, for example, construct a waterproof structure having excellent waterproofness.

The invention claimed is:

1. A curable composition comprising:
   a polyalkylene oxide having a hydrolyzable silyl group; and
   feldspars having an average particle diameter of 0.01 to 100 μm,
   wherein the feldspars are at least one selected from the group consisting of alkaline feldspar, plagioclase feldspar, nepheline, nepheline syenite, amphigene, sodalite, hauynite, lazurite, noselite and melilite, and
   wherein the curable composition comprises the feldspars in an amount of 120 to 500 parts by mass relative to 100 parts by mass of the polyalkylene oxide.

2. A waterproof structure comprising:
   a waterproof base; and
   a waterproof coating film provided on a surface of the waterproof base and comprising a cured product of the curable composition according to claim 1.

* * * * *